Patented Feb. 11, 1936

2,030,583

UNITED STATES PATENT OFFICE 2,030,583

PROCESS FOR AVOIDING SETTING PHENOMENA IN COMMERCIALLY PREPARED SALTS

Julius Haas, Kassel-Wilhelmshohe, and Gustav Adolf, Stockhausen, near Sondershausen, Germany, assignors to Wintershall Aktiengesellschaft, Kassel, Germany No Drawing. Application September 19, 1932, Serial No. 633,922. In Germany September 24, 1931

2 Claims. (Cl. 23—243)

A large portion of commercially pure salts tend to cake during storage and to form more or less solid masses, which usually cannot be loosened either by means of shovels or by the mechanical apparatus normally used for removing the salts from storage. The salt must be broken loose and in many cases must even be blasted, as a result of which considerable costs are entailed.

Further, setting phenomena appear during transport to the consumer in railway wagons or barges and the like, which leads to difficulties during discharge. Also even when using the salt itself, inconvenient consequences arise owing to insufficient comminution of the set salts brought about by the lumps contained therein; in the case of fertilizers this leads to inferior scattering, and in the case of salts used commercially, to low rates of dissolution, stoppages in, and damage to, transport and distributing apparatus, etc.

Such setting is to be observed not only in the case of salts which undergo decomposition during storage, such as superphosphate and the like, but also in the case of salts which undergo no chemical change when stored.

In so far as the setting of the salt is to be attributed to crystallization of the salt solution adhering thereto as a result of small amounts of moisture still clinging to the salt, or subsequently absorbed by the same, it is usually possible to diminish this tendency to cake by thorough drying, by complete removal of the water vapour adhering to the salt after drying and by suitable prevention of subsequent attraction for water. Many salts, however set even without the presence of moisture to form a thick, solid mass, and this applies more to those which occur in a fine form than those which are coarse.

It has now been found that these setting phenomena can be completely avoided or substantially diminished if substances are added to the salt which can be obtained in a slimy or non-crystalline form, so that they possess the property of forming an extremely fine protective coating over the individual salt granules. A suitable such medium is, for instance, ferrous hydroxide precipitated from iron vitriol with caustic soda; this forms a coating of the kind referred to and is oxidized in the air to ferric hydroxide or iron oxide. The fineness of the protective coating necessary therefor will be seen from the fact that a very efficient coating is produced by one or a few hundredths per cent of iron in a suitable form.

Of course, there is no limitation to the use of iron compounds, which have merely the advantage of cheapness for use on a large scale, but any substances can be used which can be added to the salt as a slimy or non-crystalline suspension of particularly fine subdivision. Such other compounds come into consideration mainly when it is desirable to have complete absence of iron in a salt.

Thus, the hydroxides of magnesium, aluminium, manganese and so forth, which are freshly prepared and admixed in suspension with the salts before their last drying, are suitable for the purpose in view. The additions may be chosen so that they possess favorably catalytic properties; thus, for example, manganese hydroxide may be chosen for addition to fertilizing salts.

Natural products of suitable physical properties may also be used, such as, for example, clay.

Example 1.—2,000 cwts. of potassium chloride made for fertilizing purposes and containing 80% KCl are uniformly admixed before drying with a suspension obtained by addition of 12 kgs. of caustic soda to a solution of 115 kgs. of crystallized ferrous sulphate ($FeSO_4.7H_2O$) in 430 kgs. of water. The potassium chloride treated in this way possesses extraordinarily great storage stability.

Example 2.—1 ton of Chile saltpetre is mixed with a magnesium hydroxide suspension obtained from a solution of 1.5 kgs. of magnesium chloride in 10 kgs. of water by addition of 1.3 kgs. of caustic soda. The saltpetre is very stable on storage when mixed in this way.

Example 3.—200 cwts. of very pure potassium chloride containing 99% KCl, intended for use for chlor-alkali electrolysis, are rendered stable on storage by admixture of aluminium hydroxide. The requisite quantity of aluminium hydroxide is obtained by adding 95 kgs. of caustic potash to a solution of 75 kgs. of crystallized aluminium sulphate [$Al_2(SO_4)_3.18H_2O$] in 450 kgs. of water. The precipitated hydroxide, together with the solution, is uniformly distributed throughout the said quantity of pure potassium chloride.

Example 4.—1,000 cwts. of ammonium sulphate nitrate are, before drying, mixed with a suspension of clay in water. The suspension of 30 kgs. of clay in 100 kgs. of water has been found to be a particularly suitable concentration for use with the said quantity of ammonium sulphate nitrate.

What we claim is:—

1. A method of treating technically prepared salt for the purpose of removing the caking tendency shown by the same even when stored in the finely granular state with exclusion of atmospheric moisture, consisting in adding to the salt prior to the drying of the same an aqueous suspension of an inorganic slimy substance in quantities of less than 0.2%, whereby an extremely thin protective coating forms on the individual particles without being sufficient to permit of the latter caking together and so producing coarsening of the granule.

2. A method of treating technically prepared salt for the purpose of removing the caking tendency shown by the same even when stored in the finely granular state with exclusion of atmospheric moisture, consisting in adding to the salt a suspension obtained by precipitating the aqueous solution of a salt of a metal selected from the group consisting of: iron, magnesium, manganese and aluminium, with an alkali hydroxide, the quantity of hydroxide added amounting to less than 0.2%, whereby an extremely thin protective coating forms on the individual particles without being sufficient to permit of the latter caking together and so producing coarsening of the granule.

JULIUS HAAS.
GUSTAV ADOLF.